Figure 1:
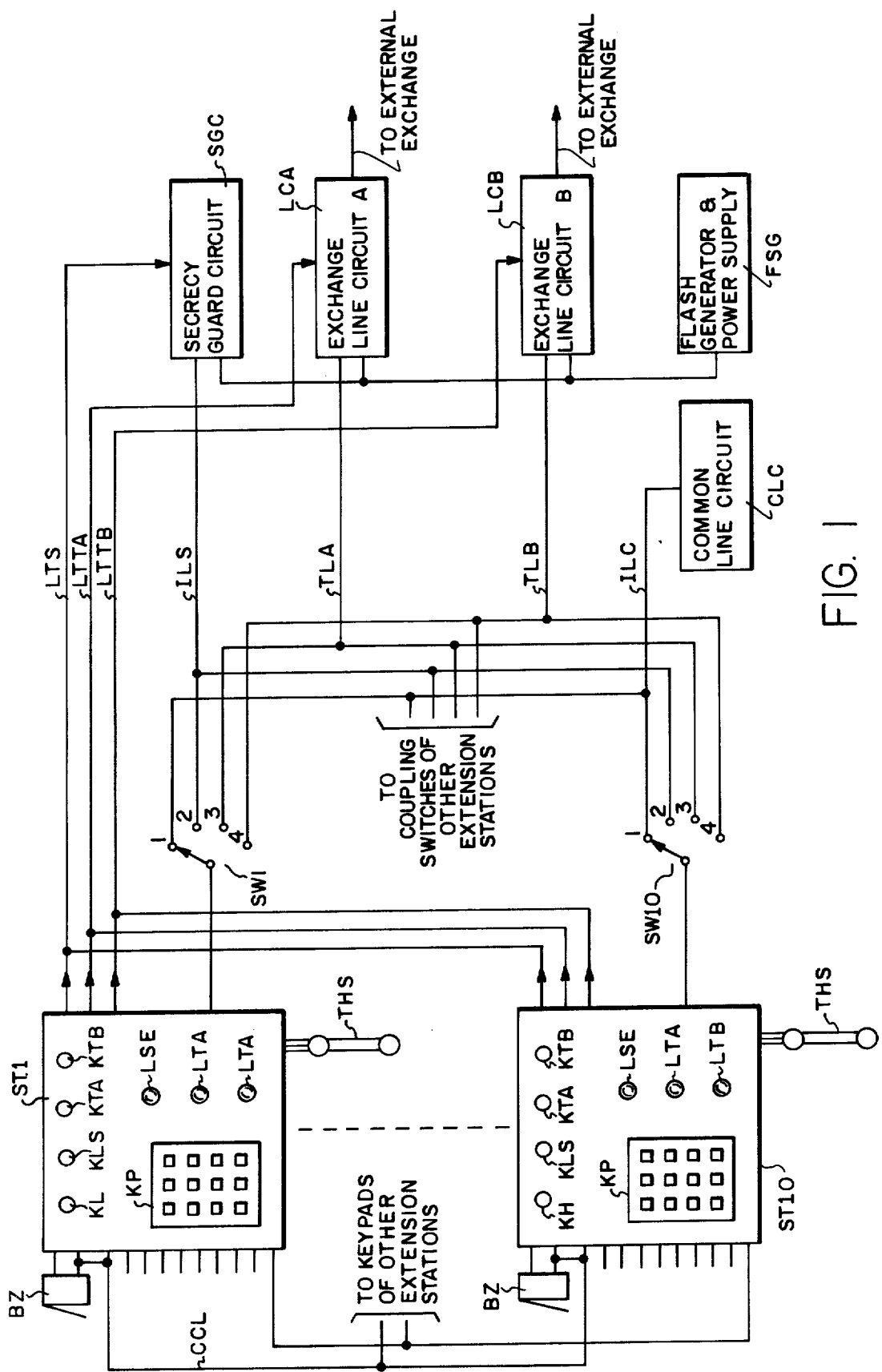

United States Patent [19]

Warman et al.

[11] 3,931,479

[45] Jan. 6, 1976

[54] TELEPHONE INTERCOMMUNICATION SYSTEM PROVIDING COMMON ACCESS TO A COMMUNICATION LINE

[75] Inventors: Bloomfield James Warman, Como, Italy; Maurice Wilfrid Kingsnorth, London, England

[73] Assignee: GTE International Incorporated, Stamford, Conn.

[22] Filed: Sept. 19, 1974

[21] Appl. No.: 507,324

[30] Foreign Application Priority Data
Oct. 26, 1973 United Kingdom............... 50060/73

[52] U.S. Cl................................... 179/37; 179/99
[51] Int. Cl.².......................................... H04M 1/00
[58] Field of Search...... 179/1 CN, 1 H, 18 AD, 37, 179/38, 39, 40, 84 B, 99, 30, 17 B, 19, 27 D, 18 BC

[56] References Cited
UNITED STATES PATENTS

| | | | |
|---|---|---|---|
| 3,342,944 | 9/1967 | Barbato et al. | 179/37 |
| 3,576,397 | 4/1971 | Pell et al. | 179/37 |
| 3,703,611 | 11/1972 | Kiyomiya et al. | 179/1 CN |
| 3,843,845 | 10/1974 | Ridley | 179/99 |
| 3,860,763 | 1/1975 | Sudoh et al. | 179/99 |

*Primary Examiner*—Thomas A. Robinson
*Attorney, Agent, or Firm*—Robert J. Black

[57] ABSTRACT

A private telephone intercommunication system including facilities for connecting the system to a telephone central office. Common supervisory means are provided to control access to a line from each station.

5 Claims, 5 Drawing Figures

TELEPHONE INTERCOMMUNICATION SYSTEM PROVIDING COMMON ACCESS TO A COMMUNICATION LINE

This invention concerns improvements in telephone intercommunication systems, and relates in particular to a system including a plurality of extension telephone stations providing common access to a telephone communication line, for example an external exchange line, without the requirement for a main station of the system attended by an operator.

In patent application, Ser. No. 507,322, filed concurrently herewith it is proposed to provide a novel telephone intercommunication system in which a connection can be established between an external exchange line and any one of a number of extension telephone stations, without the requirement for a main station attended by an operator to route calls between the exchange line and the extension telephone stations. This arrangement requires that a common supervisory means be provided for establishing a switched connection to the exchange line, for disconnecting the exchange line, and if desired, for applying a hold loop to the exchange line to enable transfer of calls between extension telephone stations. This supervisory means must be included in a common control circuit with all of the telephone stations, so that the condition of any one of the stations, for example the condition calling for the exchange line, the condition requiring establishment of a hold connection, or the disconnect condition, can be taken into account by the common supervisory means. It will be appreciated that with a substantial number of extension telephone stations the design of such a control circuit presents considerable problems in avoiding the requirement for multiple signal wires connected between each telephone station and the common supervisory means.

It is accordingly one object of the present invention to provide such a common control circuit in a simple manner.

The present invention accordingly provides a telephone communication system including a plurality of extension telephone stations, and a common supervisory means for controlling access to a communication line from each of said telephone stations, said telephone stations and said supervisory means both including elements of a common control circuit for influencing the condition of said supervisory means, and said common control circuit including a single signaling wire extending between said telephone stations and said supervisory means, the signal potential established in said wire being dependent on the condition of circuit means of each telephone station and at least two circuit means of said supervisory means, and the latter circuit means being controlled in accordance with said signal potential.

Preferably each telephone station also includes at least one circuit means controlled in accordance with said signal potential.

Since, in accordance with the arrangement of the invention, the circuit means of the said supervisory means are not merely passively controlled by the signal potential of said single signal wire, but also have an active influence on said signal potential, it is possible to arrange that circuit means of the telephone station and of the supervisory means interact with one another in a logical manner, thus providing a plurality of functions that would not otherwise be possible without a corresponding number of separate control leads to provide corresponding control signals.

In accordance with one embodiment of the invention the said circuit means of each extension telephone station comprises line switching means for establishing a connection between the telephone speech transmission circuit of said station and terminal means of said station; the said circuit means of said supervisory means comprising first switching means for effecting a connection between line wires of said communication line and common terminal means of said supervisory means connected to said terminal means of all of said extension telephone stations, and second switching means for connecting a hold loop to said line wires; the arrangement being such that with both said line switching means of any one telephone station and said first switching means of the supervisory means operated to establish a through connection from the communication line to said one telephone station, a stable state exists; and each telephone station further including manually operable means for varying the potential existing in said single signal wire in said stable state whereby by release of the first switching means and operation of the second switching means of the supervisory means a hold loop in applied to the communication line wires, and including means responsive to hanging up of said telephone station for varying the potential existing in said single signal wire in said stable state whereby by rendering both of said first and second switching means inoperative the communication line wires are released.

Preferably, the said line switching means of each telephone station and the said first switching means of the supervisory means comprise relay switching circuits having self-holding current paths interconnected by said single signal wire.

It will be appreciated that the reference above to "operated" states of the line switching means refers to the state of the switch contacts in which a switched connection is established, and not necessarily to the energized condition of any associated relay. Thus the operated states of the relay switching circuits referred to may be states in which the associated relay or relays are either in the engergized or the deenergized state depending upon the disposition of the corresponding relay contacts.

The common control circuit constructed in accordance with the invention as above described, provides for mutual control between any one telephone station and the common supervisory circuit when that telephone station has established a connection to the common communication line. In order to insure that only one telephone station at a time can establish a connection to the common communication line and thus become effectively connected as part of said common control circuit, in accordance with a further, preferred feature of the invention, each telephone station further includes manual switching means for closing a current path of said common control circuit, independent of said single signal wire, to operate said relay switching circuits and establish a through connection to said communication line wires, said independent current path including a single wire connecting all of said manual switching means to a current path of said relay switching circuit of the supervisory means, and the arrangement being such that upon operation of the relay switching circuit of the supervisory means the potential in said single wire is no longer sufficient for operation of the relay switching circuit of an extension telephone station.

The logical control of the circuit means of the supervisory means in accordance with a condition of the extension telephone station may be achieved by interaction of the circuit means of the supervisory means and the telephone station in various ways. Thus in accordance with one example of the invention, the second switching means comprises a second relay switching circuit of the supervisory means having a self-holding current path which is also connected to said single signaling wire; the arrangement being such that when said relay circuit of a telephone station is operated the potential of said single signaling wire is sufficient to cause operation of said second relay switching circuit, while upon operation of said second relay switching circuit the potential of said single signaling wire is such as to cause said relay circuit of the telephone station to release; said first relay switching circuit of the supervisory means having a first relay contact in the second switching circuit whereby the latter circuit is inoperative when the first circuit is operative, and having a second relay contact arranged to disconnect the first relay switching circuit from said single signaling wire when said circuit releases; the said manually operable means of each telephone station comprising a switch means for temporarily reducing the potential of said single signaling wire without rendering the relay switching circuit of the telephone station inoperative, whereby initially the first relay switching circuit of the supervisory means is deenergized and then, upon restoration of the control signal from the telephone station, the second relay switching circuit of the supervisory means is operated; and the means responsive to hanging up comprising a switch contact arranged to render the relay switching circuit of the telephone station inoperative.

In accordance with another example of the invention the said second switching means comprises a second, self-holding, relay switching circuit of the supervisory means, arranged to be energized together with said first relay circuit to prepare a hold loop across idle contacts of the first relay circuit, and said supervisory means further comprises a third relay switching circuit having a switch contact in the holding current path of the second relay switching circuit, the arrangement being such that upon operation of the manually operable means of a telephone station only the first switching circuit is rendered inoperative, while upon hanging up of a telephone station the first relay switching circuit is rendered inoperative and the third relay switching circuit is operated to render the second switching circuit inoperative.

Further features and advantages of the invention will become apparent from the following description with reference to the accompanying drawings.

Figure 2:
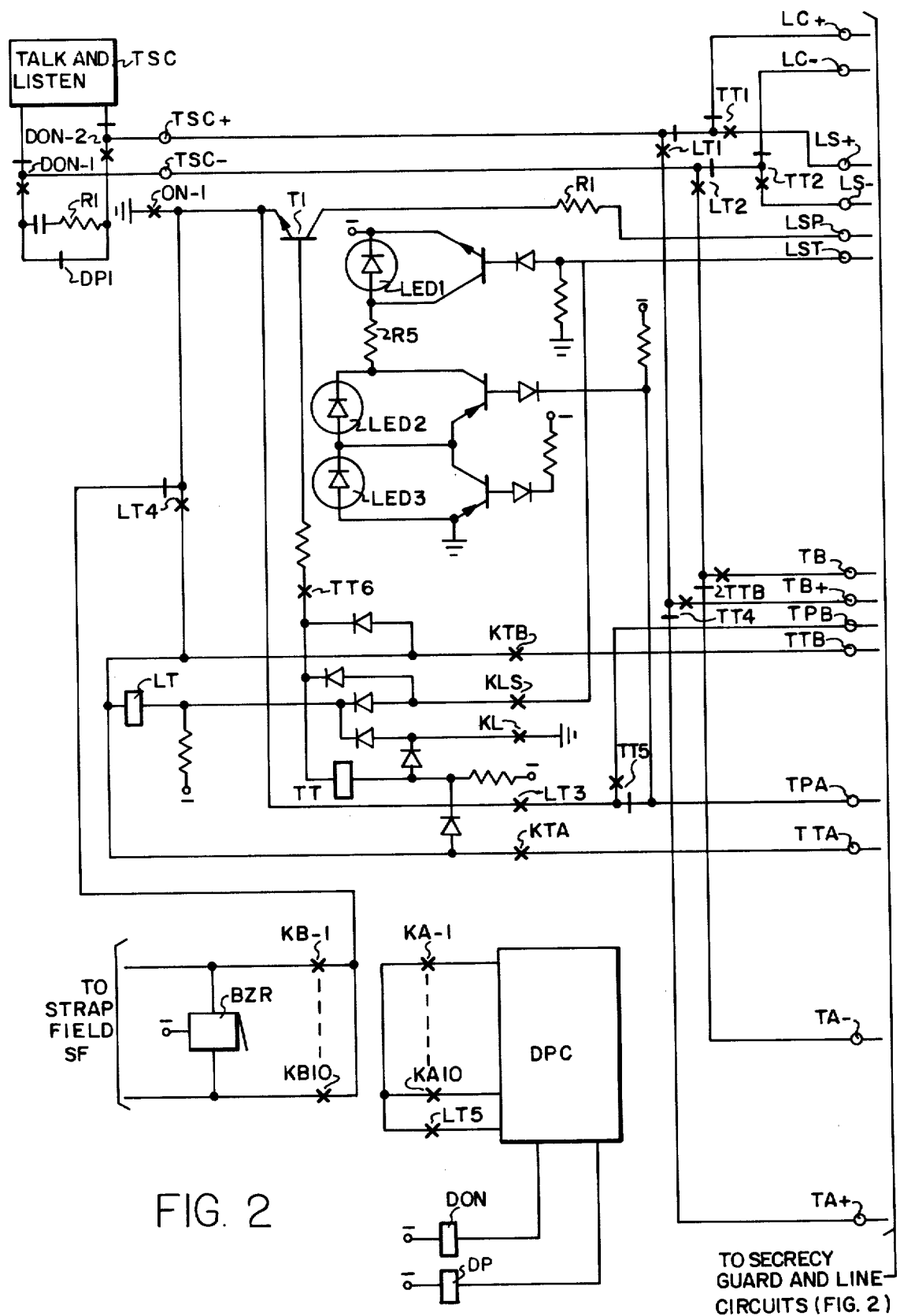
Figure 3:
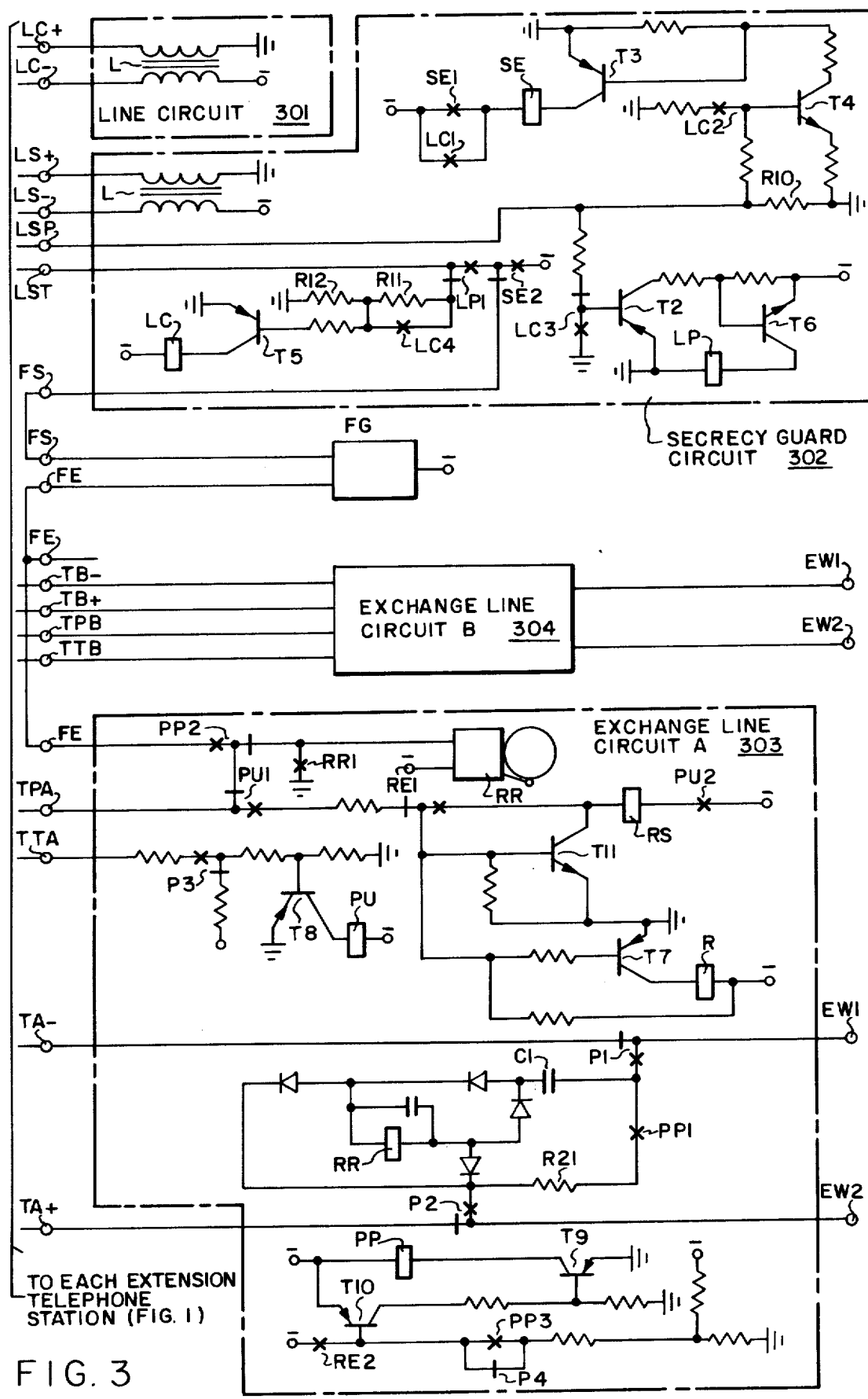
Figure 4:
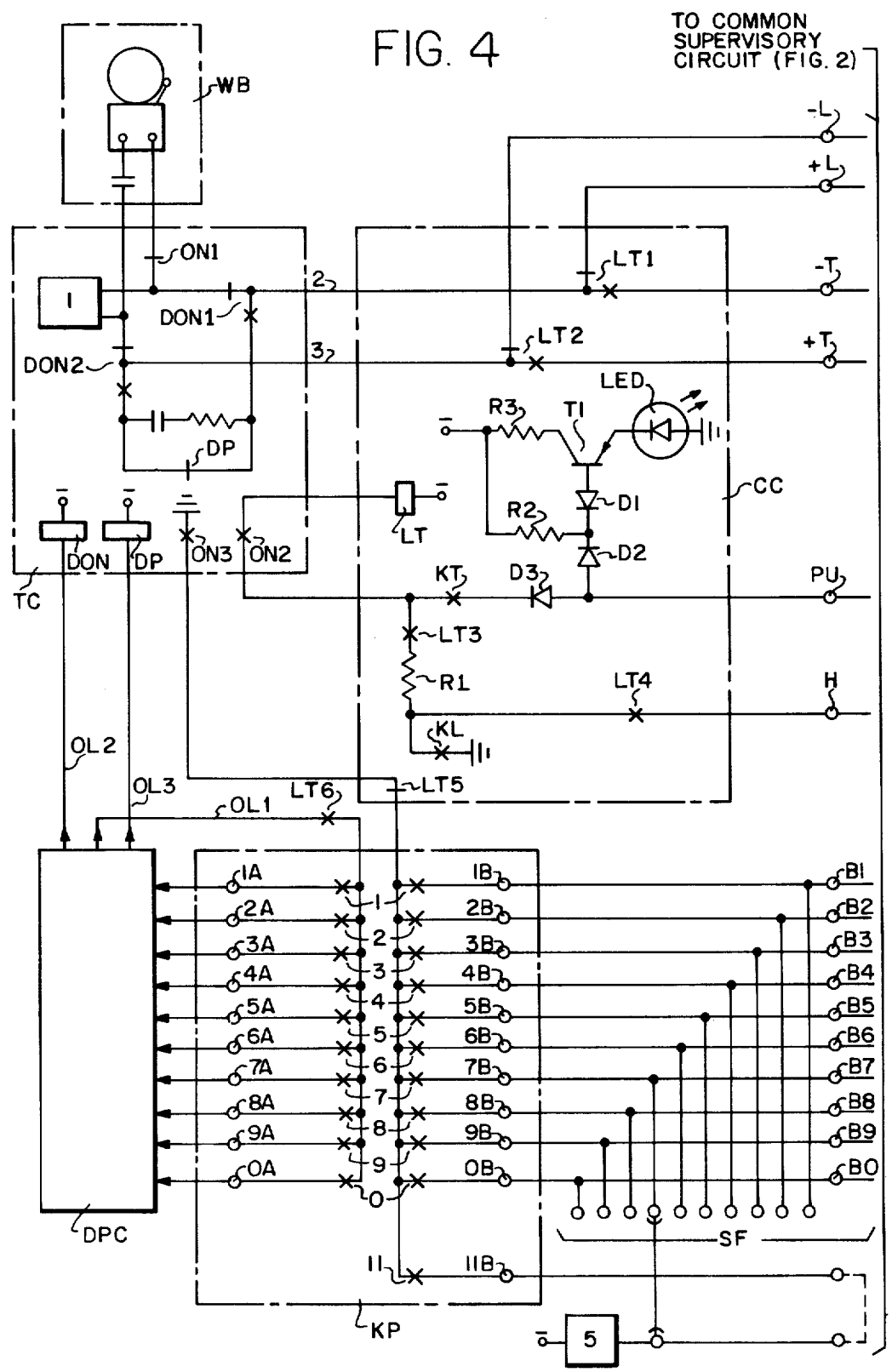
Figure 5:
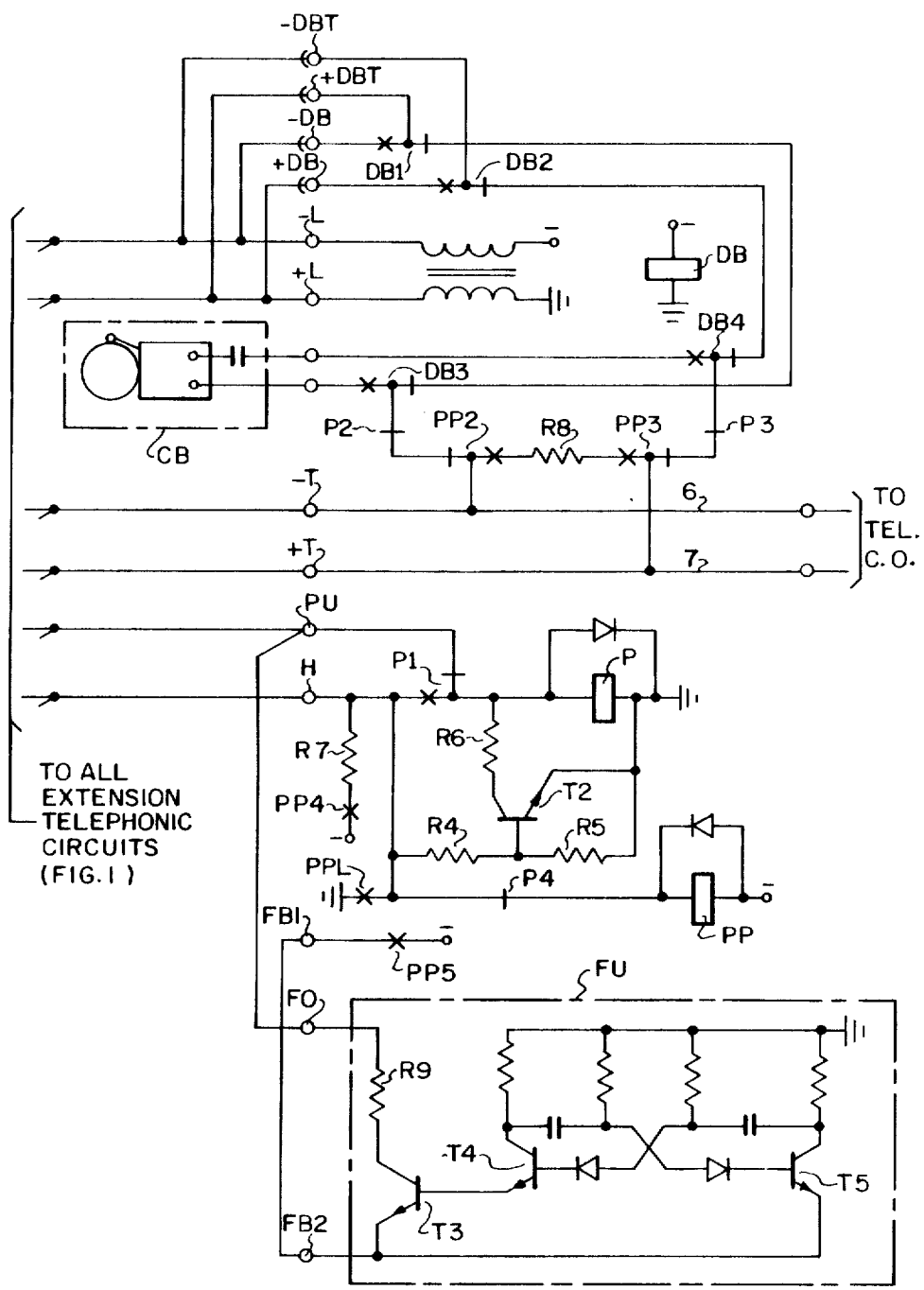

In the drawings:

FIG. 1 is a schematic block circuit diagram of a communication system according to the invention, FIGS. 2 and 3 together make up a more detailed circuit diagram of the arrangement shown in FIG. 1, and FIGS. 4 and 5 together make up a circuit diagram of another arrangement according to the invention.

Referring to FIG. 1, the intercommunication system there shown is arranged to provide a number of telephone extension stations, with two telephone lines for internal calls between the stations and two telephone lines for external calls between extension stations of the system and stations served by another exchange, for example a main public exchange. It is to be appreciated, however, that intercommunication systems according to the invention may be provided to cater for more or less than ten extension stations and with more or less than two telephone lines for internal and/or external calls.

In the diagram of FIG. 1, only two extension stations, disignated ST1 and ST10 are shown, and in use of the system, these would be allocated to respective locations within an office or factory building, or the like. Each extension telephone station comprises, in addition to the normal speech transmission circuit, a digital push button assembly, hereinafter termed a "keypad" KP, a group of four control push buttons designated KL, KLS, KTA and KTB, three visual indicators, which preferably take the form of light-emitting diodes, and designated LSE, LTA and LTB, a calling buzzer BZ, a telephone handset THS and telephone line coupling switch means, as indicated diagrammatically by the wiper and bank SW1 for station ST1 and by the wiper and bank SW10 for station ST10.

As also indicated in FIG. 1, the two telephone lines for internal calls, hereinafter termed "local" lines are indicated at ILC and ILS respectively, while the two telephone lines for external calls, hereinafter termed "trunk" lines are designated TLA and TLB respectively. The telephone lines are commoned over respective outlets of the telephone station coupling switches, which have four outlets, the first outlet 1 being a normal or rest outlet to which the local line ILC is connected, while the remaining outlets 2, 3 and 4 are connected, respectively to the local line ILS and to the trunk lines TLA and TLB. The extension stations thus have a parallel relationship to the telephone lines, so that the system is of the so-called "star" connected type, as distinct from the series connected type employing mechanically interlocked push buttons, in each telephone station, with change over contacts connected in a serial chain formation to provide the communication channel selecting function.

In the embodiment of the invention being described, the local line ILC is a "common" line that is, the communication channel provided by the line ILC is open for communication at all times to all of the extension telephones of the system. The local line ILS, on the other hand is a secret communication channel, with which a common secrecy guard circuit SGC is associated, the arrangement being such that once a connection over the local line ILS, between two or more of the extension stations of the system has been established, then no other station of the system can intrude upon that connection. The trunk lines TLA and TLB are each connected to respective external exchange lines over individual line circuits LCA and LCB, the latter being arranged so that only one extension station can have access to an exchange line at any time and so that a "hold" condition can be applied to an external exchange line, automatically, by the simple process of operating another of the push buttons at the extension telephone concerned, for example by operating the push button K1 to set up a local inquiry or transfer connection or by operating the other of the KTA or KTB buttons to set up a second external line call over the other trunk line.

The secrecy guard circuit SGC and the exchange line circuits LCA and LCB each include test circuit elements, not shown in FIG. 1 which are connected in common to each of the extension stations over respective ones of the test leads LTS, LTTA and LTTB. Within each station, the leads LCS, TCA and TCB are connected, over respective ones of the control push buttons KLS, KTA and KTB, to the line coupling switch setting control circuit, the arrangement being such that the setting of the line coupling switch to a particular outlet is effected by operation of the appropriate push button, and is depending upon the free or busy condition of the associated test circuit element.

The condition of the local secret line ILS and of the trunk lines TLA and TLB is indicated at each extension station by the indicators LSE, LTA and LTB. Thus, the indicator LSE at each station is arranged to flash when the local secret channel is in use on a two party call and to glow steadily when this channel is in use by more than two extension stations, this enables the local secret channel to be used for conference type connections involving more than two extension stations, while at the same time assuring secrecy on two party calls. Similarly, the indicators LTA and LTB glow steadily when the respective trunk lines LTA and LTB are in use, and flash when the respective exchange line is on hold. To provide for the flashing signal indications a flash signal generator FSG is provided and is arranged for control from the secrecy guard circuit SGC and from the exchange line circuits LCA and LCB.

For incoming calls, a system of calling bells not shown in FIG. 1 is provided and located so that each extension station is within earshot of at least one bell, the arrangement being such that upon the occurrence of a call incoming over one or other of the exchange lines, the calling bells are caused to respond to the ringing signal from the external exchange while at the same time the respective indicator in each extension station is caused to blink in sympathy with the ringing signal interruptions, so that the incoming call may be answered by any extension station by removal of the station handset and operation of the appropriate control button KTA or KTB.

The keypad KP in each station is used to effect calling between stations of the system and also to effect the transmission of digital switch setting information to an external exchange for the setting up of an external call, thereat. To this end, as explained in more detail below, each push button of the keypad assembly actuates contacts in each of two electrically separate contact groups one or other of which is rendered effective depending upon the setting of the associated line coupling switch SW. Thus, for calling between stations of the system, that is, with the line coupling switch of the calling station in its first or second outlet position, the keypad contacts forming one group are effectively connected to respective ones of a group of calling signal leads CCL, which are commoned to respective contacts of the corresponding contact group of each extension station of the system. Also, within each station the calling buzzer BZ is connected to a respective one of these calling signal leads, as indicated by the strap ST1 for extension station 1, and by the strap ST10 for the extension station 10. Thus any extension station may call any other extension station by operating the keypad push button corresponding to the number of the wanted extension station and by lifting the station handset to listen for a verbal reply over the common channel ILC. For the establishment of external calls, the other group of keypad contacts is rendered effective upon the line coupling switch SW being set to a trunk line outlet 3 or 4. In the proposed arrangement, the contacts of this keypad contact group, in each extension station, are connected to an electronic digit signal sending element which may take the form of a dial pulse sending element of the kind which registers the digital value of each digit of the wanted external subscriber's directory number as it is keyed out from the keypad KP and then proceeds to send out over the trunk line concerned corresponding digital signals, for example as trains of impulses or as multi-frequency digital signal codes.

Now referring to FIGS. 2 and 3, FIG. 2 shows the circuitry which is repeated for each extension telephone station of the system, the outputs from each telephone station being indicated at the right-hand side of FIG. 2 and all these outputs of the several stations being connected in common. Outputs LC− and LC+ correspond to the lead ILC in FIG. 1, output LST corresponds to the line ILS of FIG. 1, outputs LS−, LS+ and LSP correspond to the line ILS of FIG. 1, outputs TA−, TA+ and TPA correspond to the line TLA in FIG. 1, output TTA corresponds to the line LTTA of FIG. 1, and outputs TB−, TB+ and TBA correspond to the line TLB of FIG. 1, while output TTB corresponds to the line LTTB of FIG. 1.

As is conventional each telephone station includes a telephone speech transmission circuit included within box TSC, and connected to the telephone handset. The telephone handset actuates a hook switch having normally open off-normal contact ON1. Relay contacts DON1 and DON2 provide for connection of an external exchange line either to leads TSC− and TSC+ of the speech transmission circuit TSC, or to a conventional dial pulse transmitting circuit including a relay contact DP1. Corresponding relays DON and DP are connected to a dial pulse sending circuit indicated within the box DPC, the operation of this circuit and the relays DON and DP being well known. The telephone keypad KP referred to above has two sets of operable contacts KA1 to KA0 and KB1 to KB0 as already described, these being connected as shown in FIG. 2 to provide alternative outputs either to the dial pulse circuit DPC or to a strapping field SF. Either one of the two groups of contacts may be rendered operative as already described above, by means of relay LT. When the LT relay is unoperated, a ground, via contact LT4 and the dial off-normal contact ON1 enables the keypad for selective calling of another telephone station by way of the strapping field and corresponding connected buzzer BZR.

FIG. 3 is divided into separate circuit units corresponding to the units illustrated at the right hand side of FIG. 1, and the functions of the remaining components illustrated in FIGS. 2 and 3 have either been indicated above or will become apparent from the detailed description of the operation of the system now set out below.

1. Non-Secret Local Call

When any telephone station goes off-hook, starting from the idle condition shown in FIGS. 2 and 3 the leads TSC− and TSC+ of the telephone speech transmission circuit become connected to the lines LC− and LC+ of the common line circuit illustrated in FIG. 3, without the requirement for any push button operation to initiate the call. If the telephone station desires to make an internal call, the calling party operates his keypad to actuate the local buzzer at the wanted station and awaits a verbal answer. The keypad is rendered effective to actuate the buzzer by the relay contact LT4 which remains in the idle condition.

2. Secret Local Call

If parties to a call set up as described in paragraph 1 above wish their conversation to be confidential, or if a long conversation is involved and it is desired to free the common line circuit for use by other parties, each party presses their KLS button to transfer to the secrecy guard circuit indicated in FIG. 3. When the first KLS button is pressed; the battery potential from the corresponding extension telephone station is extended via lead LST to the secrecy guard circuit, the battery potential being applied via relay contact LP1 and the potential divider R11 and R12 to the base of transistor T5. Transistor T5 accordingly turns on and relay LC is energized. Relay contacts LC1 to LC4 accordingly change over from the position indicated in the drawing. Relay contact LC4 bypasses resistance R11, and this increases the current flowing in lead LST. As a result of the increased current through line LST, the relay TT of the telephone extension station is now operated, and the leads TSC— and TSC+ of the telephone speech transmission circuit TSC are accordingly extended via relay contacts TT1 and TT2 to the terminals LS+ and LS— of the secrecy guard circuit. By way of relay contact TT6, the relay TT is held energized over the lead LSP, via the forward biased emitter-base junction of transistor T1, and the now closed hook switch contact ON1.

The operation of relay LC initiates the operation of the secrecy indication signal facility, which was referred to in the introductory paragraphs. When relay LC operates in the manner described in the preceding paragraph, the associated contacts LC1 and LC2 change over from the position indicated in the drawing. Contact LC2 switches in emitter-base current for transistor T4 which turns on and provides emitter-base current for transistor T3 which accordingly turns on. SE relay now operates by way of the path: ground, transistor T3, the 590 OHM winding of SE relay LC1 contact, battery. A self hold path for relay SE is provided via contact SE1.

Upon depression of any further KLS contact while the initial contact remains depressed, the corresponding relay or relays TT are likewise energized so that the speech transmission circuits of the corresponding telephone stations are also connected to the terminals L— and L+ of the secrecy guard circuit. Upon release of the last KLS key, the battery potential is removed from the lead LST and thus the transistor T5 is turned off and relay LC becomes deenergized so that relay contacts LC1 to LC4 all return to their idle conditions. The opening of relay contact LC1 is of no effect, since it has already been bridged by relay contact SE1 upon energization of relay SE as described in the above paragraph. Relay contact LC2 removes ground potential from the base of transistor T4, so that the caller is dependent on the potential on the LSP wire. The value of resistor R1 (FIG. 2) is such that when more than two relay windings TT are connected in parallel, the current flowing between resistor R1 and resistor R10 (FIG. 3) provides at the base of transistor T4 a potential sufficient to keep T4 turned on and to maintain the relay SE energized. If just two TT windings are connected in parallel, the current flowing in the LSP wire results in a potential which is insufficient to keep T4 turned on and the relay SE thus becomes deenergized.

When the LC relay releases as was described above, and the contact LC2 returns to its normal position, transistor T2 (FIG. 3) is turned on. The transistor T2 provides a bias current for transistor T6 which accordingly turns on and provides an operate path for relay LP. Relay LP operates, and relay contact LP1 changes over. The relay contact LP1 connects the circuit of a light-emitting diode LED1 (FIG. 2) via the LST lead, to the SE2 relay contact. Depending on the state of the SE relay as described above, the light-emitting diode circuit will be connected to battery via the relay contact LP1 (operated) and SE2 (operated), or to a flash generator circuit FG via LP1 (operated), SE2 (normal), the terminal FS and the flash generator circuit FG. If more than two extensions are connected to the secrecy guard circuit, the SE relay will be operated from battery via SE2 contact (operated) and the light-emitting diode LED1 will glow permanently, thus giving an indication to each extension that more than two extensions are involved in the call. If just two extensions are connected to the secrecy guard circuit, the SE relay will be released as has been described and the light-emitting diode LED1 will be connected to the intermittent battery of the flash generator FG via the SE2 contact (normal) causing the light-emitting diode LED1 to flash, thus indicating to the parties that only two extensions are involved in the call, and that a confidential call exists.

Upon termination of the call thus set up; when the last party hangs up, the off-normal contact ON1 in the extension instrument, releases and disconnects the main holding ground. Relay TT accordingly releases, and the secrecy guard circuit becomes open circuited at relay contacts TT1 and TT2. Relays SE and LP also release at the cessation of the above mentioned holding ground, and disconnect the secrecy indication signaling facility.

3. Exchange Call

The system as described above has two exchange line circuits indicated at A and B in FIG. 1 and circuit A being illustrated in more detail in FIG. 3. Since both of these circuits are identical, however, only circuit A will be described in detail.

Relay P in the exchange line circuit is always operated when the said exchange line is in the idle and hold conditions. The operate path for the said relay is via transistor T7.

Assuming that an incoming call is received; the ringing current is received, via exchange wires EW1 and EW2 and relay contacts P1 and P2 (operated), by the rectifier bridge shown and then is conducted to the winding of a ringing current detector relay RR. Energization of said relay causes closure of the associated relay contact RR1 which closes the circuit of the warning bell system shown in box CB, and applies ground potential from terminal TPA to a switching circuit of the associated light-emitting diode LED2, at each extension, to illuminate the diode and give the identification of the exchange line from which the call is being transmitted. When a telephone extension goes off-hook the speech transmission circuit is, as described above, initially connected to terminals —LC and +LC of the common line circuit. However, to establish a connection with the desired external exchange line, one of the push buttons KTA or KTB is pressed, according to the exchange line to be connected.

Assuming that button KTA is pressed, relay LT is energized via the connection to ground through lead TTA and relay contacts LT1 to LT5 are thus transferred. The potential at the base of transistor T8 is sufficiently negative in order to forward bias the emitter-base of the said transistor and provide an operate path for relay PU so that relay PU becomes operated, and relay contacts PU1 and PU2 are thus transferred. Relay contacts LT1 and LT2 connect the speech transmission circuit TSC to terminals TA— and TA+ of the exchange line circuit via relay contacts TT3 and TT4. Relay contact LT4 holds relay LT energized, while relay contact LT3 extends ground potential via hook switch ON1 to the terminal TPA of the exchange line circuit A. (If button KTB were pressed, then both relays LT and TT would be energized to connect the speech transmission circuit TSC via contacts LT1, LT2 and TT3 and TT4 to terminals TB— and TB+ of the exchange line circuit B, the relays being held via contacts LT4, and LT3 and TT6 respectively, and ground potential being extended to lead TPB via contacts LT3 and TT5. The operation would otherwise be the same as described in connection with the exchange line circuit A). Ground potential at terminal TPA now causes the light-emitting diode LED2 to be steadily illuminated to indicate that the exchange line is busy. Relay contact PU1 closes a path to the base of transistor T7 so that both the base and emitter thereof are at ground potential and the transistor T7 turns off. Relay P therefore releases and its associated contacts revert to their normal positions. The above mentioned ringing current detector is switched out of circuit at contacts P1 and P2, and the exchange line is extended to the extension instrument, via terminals TA— and TA+. Relay contact P3 completes a holding current path for relay PU. When relay contact P4 restores to normal, transistors T9 and T10 turn on in well known manner and transistor T9 switches in an operate path for relay PP. Relay PP operates and holds via its own contact at PP3, prepares a holding loop at contact PP1 for the exchange line hold condition, to be described below, and prepares the flash generator circuit, at contact PP2, for connection to the light-emitting diode circuit.

4. Exchange Line Hold Condition

This is applied by removing the ground potential from lead TPA (or TPB), which occurs automatically upon an extension telephone setting another call without hanging up from the exchange call. For example, starting from the condition as described above, by pressing button KTB relay TT operates and at contact TT5 moves the ground potential from terminal TPA. Alternatively, by pressing button KL for transfer to the common line circuit, relay LT is deenergized and at relay contact LT3 removes the ground potential from the lead TPA. Removal of this ground potential from lead TPA allows the transistor T7 in the exchange line circuit A to turn on once more, thus switching in the operate path for relay P. Relay P re-operates and at the operated relay contacts P1 and P2, removes the exchange line from the extension. The line is held to the exchange via relay contact PP1 (operated) and a 200 OHM hold resistor R21.

When relay P re-operates as described in the above paragraph, the holding battery for maintaining an operate path for relay PU via transistor T8 is removed at the contact P3, and relay PU is released. The intermittent battery from the flash generator FG is thus extended to the light-emitting diode LED2 via, terminal FE, relay contact PP2 (operated) and relay contact PU1 (released) all these being in the exchange line circuit, the TPA wire and the light-emitting diode circuit. The light-emitting diode will flash in accordance with the intermittent battery thus giving the "line held" indication.

Any telephone extension may now connect to the exchange line A, by operation of the corresponding push button switch KTA, but the flashing signal from the light-emitting diode LED2 will deter a party from making such a connection unless that party has received a message indicating that this connection is desired by the party calling on the exchange line.

5. Release of Exchange Line

When a telephone extension connected to an exchange line hangs up, the contacts ON1 of the hook switch operated by the telephone handset are opened, thus removing the ground potential from the relay LT. However, ground potential is initially maintained at lead TPA (or TPB), so that relay LT remains energized by current flowing to lead TPA. This current flow causes transistor T11 to be turned on and relay RE to be energized, whereby relay contacts RE1 and RE2 change over. Relay contact RE2 thus extends battery potential to the base of transistor T10, thus causing the transistors T10 and T9 to turn off and cause the release of relay PP. Contact PP2 in releasing, disconnects the flash generator from the exchange line circuit. Relay contact RE1 also disconnects the final holding ground for relay LT. Relay LT, accordingly releases, and at contacts LT1 and LT2 disconnects the extension from the exchange line circuit.

The removal of ground from the off-normal contacts ON1 as described above, allows transistors T4 and T3 to turn on once more. Relay P therefore re-operates and releases the exchange line from the exchange line circuit at contacts P1 and P2, and releases the PU relay at contact P3. Relay PU in operating finally releases the relay RE at relay contact PU2.

When the exchange line is in the line held condition, the line cannot release itself in the manner described above. The button KTA (or KTB) must be depressed so that the exchange line in question can be seized once more; release will then follow as described above upon hanging up of the connected extension.

Referring to FIGS. 4 and 5, there is shown a telephone intercommunication circuit similar to that of FIGS. 1 to 3, but being of simplified arrangement and only having one external exchange line and one common communication line circuit.

Referring Now to FIG. 4, each extension telephone station comprises conventional telephone circuitry indicated within the box TC in broken lines, a push button keypad shown within the box KP in broken lines, a dial pulse circuit shown by the box DPC, and a manually operable control circuit included within the box CC shown in broken lines, to provide for optional selection of a connection to an external exchange line, or of transfer from an external exchange line to a local line connection via the internal connection line. In addition one only of the extension stations includes a wall bell indicated within the box WB in broken lines, for the purpose to be described below.

As is well known, the circuit TC includes a conventional talk and listen circuit 1 connected to the telephone handset, a hook switch having a normally closed contact ON1 and normally open contacts ON2 and ON3, and dial pulse relays DON and DP each connected to the battery power source. The relay DON has normally closed contacts DON1 and DON2 provided in leads 2 and 3 from the talk and listen circuit. The relay DP has a contact in a pulsing circuit which is connected to the leads 2 and 3 by make contacts DON1 and DON2 when the relay DON is energized.

The keypad KP is of known type comprising twelve push buttons each having two operable make contacts. Only the contacts of keys 1 to 0 are connected, as indicated, to outputs 1A to 0A and 1B to 0B of the keypad circuit. In addition, one contact of the eleventh key is connected to an output 11 of the keypad circuit, for the purpose to be described below. The outputs 1A to 0A are connected via corresponding leads to the dial pulse circuit DPC, of which output leads are connected respectively to the relays DON and DP. The dial pulse circuit is an electronic integrated circuit element which may be purchased as a component from any number of well known suppliers of telephone equipment, its arrangement being such that when a potential, derived from the dial pulse circuit over an output lead OL1 and via relay contact LT6, is applied to one of the dial pulse circuit inputs 1A to 0A from the keypad KP, the relays DON and DP are operated over leads OL2 and OL3 to transmit a number of dial impulses corresponding to that input, over the leads 2 and 3 of the circuit TC. It will be appreciated that circuits DPC and TC may be modified to provide multifrequency tone sending when required for use with an external exchange operating on this system. The outputs 1B to 0B of the keypad KP are connected via a strapping field SF to output terminals B1 to B0 of the telephone extension station, the respective outputs B1 to B0 of the several extensions being connected together. The strapping field SF of each telephone extension provides a connection between one of the terminals B1 to B0 and a buzzer of the individual extension station, for example, as indicated by the dotted line connection between output 7 and buzzer 5 in the drawing. Although the arrangement shown provides for only ten outputs to ten telephone extension stations, it is possible for two extension telephones close together to share the buzz calling address, either by both buzzers of the two stations being strapped together or a single buzzer being provided. Furthermore, a secretary's telephone instrument can be strapped to have the same address as her principal, so that she can answer all calls to his telephone instrument. In such a case the output 11 of the secretary's telephone instrument may be connected to the buzzer of the principal's telephone to permit local buzz calling of the principal by the secretary. As will be described below, the keypad KP can provide an output signal from only one of the groups of outputs 1A to 0A or 1B to 0B and 11 at a time, under the control of relay contacts LT5 and LT6. The circuit CC includes a relay LT connected between the battery power supply and one side of the switch contact ON2; a push button switch KT for selection of the external exchange line; a push button switch KL for transfer to a local line connection via the internal communication circuit; and a warning signal provided by a light-emitting diode LED for indicating the busy condition of the external exchange line.

Referring now to FIG. 5, there will be described the supervisory circuit common to all the telephone line extensions. This circuit includes terminals −T and +T connected in common to the corresponding output terminals of all the individual circuits CC, and providing access to an external telephone line through the public exchange, via wires 6 and 7. Terminals −L and +L of the supervisory circuit are also connected in common to the corresponding terminals of each circuit CC (with the exception of one, see below) to provide connection between each of the extension telephone stations and a local battery feed supply providing power for internal communication between extension telephone stations connected, in parallel, to the terminals −L and +L. In the idle condition of the communication system, the public exchange line wires 6 and 7 are connected via relay contacts P2, P3, PP2, PP3, DB3 and DB4 to a system of calling bells indicated within the box CB shown in dotted lines, these bells being arranged to provide a common warning audible from all of the extension stations. Terminals PU and H of the supervisory circuit provide connection between the corresponding terminals of all circuits CC and a circuit including relays P, and PP for controlling access of the individual extension stations to the public exchange line together with an electronic multivibrator element which operates to provide a flashing signal to the light-emitting diode of circuit CC, when required. The operation of this circuit will be described in more detail below. The supervisory circuit further comprises a relay DB connected across the battery power source for the intercommunication system, this relay serving to sense a failure of the power supply. Corresponding contacts DB1 to DB4 of the relay are connected as shown so that upon failure of the power supply the public exchange lines 6 and 7 are connected to terminals −DBT and +DBT of the supervisory circuit, these latter terminals being connected via a strapping indicated to output terminals −L and +L of that circuit CC of the one corresponding extension telephone which is not directly connected to the corresponding terminals −L and +L of the supervisory circuit and which includes the wall bell WB. Thus when there is a power failure this telephone station is directly connected to the exchange line to operate as a single telephone instrument. When the relay DB is energized the connection between the circuit CC of this telephone and the terminals −L and +L of the supervisory circuit is established via the strapping indicated, the terminals −DBT and +DBT and −DB and +DB, and the relay contacts DB1 and DB2.

The operation of the telephone intercommunication circuit described above will now be described in more detail below.

1. Local Call Between Extension Telephones

With the system in the idle condition as shown in the drawing, when one of the extension telephones goes off-hook the talk and listen circuit 1 is connected via leads 2 and 3 and relay contacts LT1 and LT2 to the terminals −L and +L of the circuit CC and then to the corresponding terminals of the supervisory circuit. The local battery feed from the supervisory circuit is thus extended to the talk and listen circuit 1. The relay contact LT5 provides ground potential via the operated hook switch contacts ON3, to that set of the keypad contacts connected to outputs 1B to 0B and 11B, and thus upon closure of any one of these contacts ground potential is transmitted by the corresponding output and the strapping field SF to the corresponding buzzer of another one of the telephone stations. When this called telephone station now goes off-hook the talk and listen circuit 1 is likewise connected to the terminals −L and +L of the supervisory circuit and thus an internal communication connection is established between the two extension telephone stations. For a conference call, any number of telephone stations may likewise be buzzed and establish a connection to the local line circuit provided by terminals −L and +L of the supervisory circuit. If an extension telephone called is one of two extensions connected together with a common buzzer, for example a secretary's telephone provided with the buzzer and connected together with a principal's telephone extension then the call may be answered by the secretary and then if necessary can be transferred to the principal by operation of her keypad contact 11 to operate the buzzer of the principal extension.

2. Exchange Call

Assuming that an incoming call is received, the calling bells CB will provide a warning signal, and any one of the extension telephone stations has the option of answering the call. When a telephone extension now goes off-hook, the talk and listen circuit 1 is, as described above, initially connected to terminals −L and +L. However, to establish a connection with the external exchange line the push button KT of circuit CC is operated at the answering extension, and thus battery potential is extended from the circuit CC via relay LT, the now closed hook switch contact ON2, switch contact KT, and diode D3, to the terminal PU of the supervisory circuit. Assuming that relay P of the supervisory circuit has not already been energized, relay LT of the circuit CC is operated in the circuit: battery, winding of relay LT, operated hook switch contacts ON2, operated key contact KT, diode D3, terminal PU of the circuit CC, terminal PU of the supervisory circuit, and the winding of relay P in parallel with the emitter-collector path of transistor T2, to ground. In this condition, the bias applied to the base electrode of transistor T2 from battery, via the winding of relay PP, contact P4 (normal) and resistors R4, R5, is such that the transistor T2 is rendered conductive by the potential which appears on the terminal PU. The transistor T2 thus shunts relay P and prevents its immediate operation. Relay PP is also unaffected by the bias current which flows. In the circuit CC, the operation of relay LT, at contacts LT3 and LT4 completes a path via resistor R1 to terminal H. While the contact KT remains closed, a current path from terminal H to ground is completed via the terminal PU, and, in accordance with the value of resistor R1, the bias current through resistors R4, R5 is reduced and causes the transistor T2 to turn OFF, thus removing the shunt from relay P, which now operates. In the circuit CC, the operated contacts LT1 to LT2 connect the talk and listen circuit 1 to the exchange wires 6 and 7. Contact LT5 disconnects ground potential from the buzzer outputs 1B to 0B, while contact LT6 prepares a path from the dial pulse circuit DPC to the outputs 1A to 0A of the keypad KP. In the supervisory circuit, operation of relay P at contact P1 completes a holding circuit for itself and relay LT in the circuit CC, independent of the key switch contacts KT. Also, in the circuit CC, the diode D2 in the circuit of transistor T1 is no longer forwardly biased, in which condition the transistor T1 operates to cause the light-emitting diode LED to glow, thereby indicating the busy condition of the exchange line. In the supervisory circuit operation of contacts P2 and P3 disconnect the external exchange wires 6 and 7 from the system of calling bells CB while contact P4 opens a point in the path to relay PP, disconnecting the initial bias circuit for transistor T2. The exchange line connection is now complete and conversation may ensue. It will be appreciated that with the arrangement as described above, if the keys KT in two or more circuits CC are operated simultaneously, then the supervisory circuit P relay in parallel with the emitter-collector path of transistor T2 limits the current in the PU path so that no LT relay receives sufficient current to operate, and no circuit action will occur until all but one KT switch is restored. Should the key contacts KT be held operated after the operation of relay P in the supervisory circuit, then the PU common is isolated from the hold path for relays P and LT, by the diode D3, and consequently no other CC circuit can interfere with the holding of the circuit in question. If the connection to the exchange line is not in reply to an incoming call, but the extension station desired to make an outgoing call, then this may be achieved by means of the keypad KP, the contacts to outputs 1A to 0A of which are now rendered operative by means of the relay contact LT6.

3. Hold Condition

Should the extension telephone now connected to the public exchange line wish to return to a local extension call, the button KL of the extension telephone is pressed thus applying ground potential to terminal H of the supervisory circuit and short-circuiting relay P. The relay P thus becomes deenergized and its contacts P1 to P4 restore to their normal positions. Contact P4 restoring completes an operating circuit for relay PP, and relay PP operating completes, at contact PP1, a holding circuit for relay PP independent of the ground on terminal H from the operated key KL of the circuit CC. Relay PP also, at contacts PP2 and PP3, disconnects the call bells CB from the exchange line and connects a holding loop thereto over resistor R8, at contact PP4, applies battery via resistor R7 to the bias resistors R4 and R5 to prepare the transistor T2 for operation to guard relay P, and, at contact PP5, applies battery over a connection linking terminals FB1 and FB2 to start the flasher unit FU. The flasher unit comprises a multivibrator circuit, formed by the symmetrically interconnected transistors T4 and T5, and an output transistor T3, the latter having its collector load impedance R9 connected by way of the linked terminals F0 and PU to ground via the parallel combination of relay P and the collector-emitter path of transistor T2. Thus, during operation of the flasher unit, alternate potential changes occur at terminal PU which forward and reverse bias the diode D2 in the circuit CC, thus causing the light-emitting diodes LED in all circuits CC to flash in step with the operations of the flasher unit, to indicate that the exchange line is being held. Since the original hold circuit for relay LT is now disconnected at contact P1 in the supervisory circuit, release of the button KL in the circuit CC allows the relay LT to restore, so that contact LT1 − LT6 return to their normal positions. The calling telephone extension may now make an internal call via the internal communication line and following this call the extension may either return to the exchange line by again pressing push button KT or, alternatively, any other telephone extension may connect to the exchange line by pressing their button KT, the circuit action being similar to that described above for the initial exchange line connection, except that upon the operation of relay P, subsequent to the operation of relay LT, contact P4 opens to release relay PP which restores its contacts PP1 to PP5 thus terminating the operation of the flasher unit FU. Although any telephone extension is free to connect to the external exchange line while the latter is in the held condition, it will be appreciated that the flashing indication provided by the light-emitting diode will deter an extension from connecting to the exchange line unless it has been indicated via the internal communication circuit that the external caller desires connection to that extension.

4. Release of Exchange Line

When an extension telephone connected to the external exchange line releases, the hook switch contacts ON1, ON2 and ON3 restore. Contact ON restoring, deenergizes relay LT in the circuit CC and relay P in the supervisory circuit, so that the contacts LT1 – LT5, in the circuit CC and the contacts P1 – P4 restore to their normal conditions. The external exchange line is now again in the idle condition.

As will be understood from the above description, the present invention provides in a simple manner a common control circuit for a telephone communication system, which control circuit comprises circuit elements distributed between a common supervisory means for a communication line and a plurality of extension telephone stations having access to said common communication line, the number of control signal leads linking the telephone stations to the common supervisory means being reduced to a minimum.

What we claim is:

1. A telephone communication system including a plurality of extension telephone stations, and a common supervisory means for controlling access to a communication line from each of said telephone stations, said telephone stations and said supervisory means both including elements of a common control circuit for influencing the condition of said supervisory means, and said common control circuit including a single signaling wire extending between said telephone stations and said supervisory means, the signal potential established in said wire being dependent on the condition of circuit means of each telephone station and at least two circuit means of said supervisory means, and the later circuit means being controlled in accordance with said signal potential; each of said telephone stations also including at least one circuit means controlled in accordance with said signal potential; said circuit means of each extension telephone station comprising line switching means for establishing a connection between the telephone speech transmission circuit of said station and terminal means of said station; said circuit means of said supervisory means comprising first switching means for effecting a connection between line wires of said communication line and common terminal means of said supervisory means connected to said terminal means of all of said extension telephone stations, and second switching means for connecting a hold loop to said line wires; the arrangement being such that with both said line switching means of any one telephone station and said first switching means of the supervisory means operated to establish a through connection from the communication line to said one telephone station, a stable state exists; and each telephone station further including manually operable means for varying the potential existing in said single signal wire in said stable state whereby by release of the first switching means and operation of the second switching means of the supervisory means a hold loop is applied to the communication line wires, and including means responsive to hanging up of said telephone station for varying the potential existing in said single signal wire in said stable state whereby by rendering both of said first and second switching means inoperative the communication line wires are released.

2. A telephone intercommunication circuit as claimed in claim 1, in which the said line switching means of each telephone station and the said first switching means of the supervisory means comprise relay switching circuits having self-holding current paths forming potential divider circuits, a tapping on each of said potential divider circuits being connected to said single signal wire.

3. A telephone intercommunication circuit as claimed in claim 2, in which each telephone station further includes manual switching means for closing a current path of said common control circuit, independent of said single signal wire, to operate said relay switching circuits and establish a through connection to said communication line wires, said independent current path including a single wire extending between all of said manual switching means and a tapping of a potential divider circuit formed by a holding current path of said relay switching circuit of the supervisory means, and the arrangement being such that upon completion of said holding current path the potential at said tapping is no longer sufficient for actuation of the relay switching circuit of an extension telephone station.

4. A telephone intercommunication system as claimed in claim 2, in which the said second switching means comprises a second relay switching circuit of the supervisory means having a self-holding current path forming a potential divider circuit of which a tapping is also connected to said single signaling wire; the arrangement being such that when said relay circuit of a telephone station is actuated the potential of said single signaling wire is sufficient to cause actuation of said second relay switching circuit, while upon actuation of said second relay switching circuit the potential of said single signaling wire is such as to cause said relay circuit of the telephone station to release; said first relay switching circuit of the supervisory means having a first relay contact in the second switching circuit whereby the latter circuit is inoperative when the first circuit is operative, and having a second relay contact arranged to disconnect the first relay switching circuit from said single signaling wire when said circuit releases; said manually operable means of each telephone station comprising a switch means for temporarily reducing the potential of said single signaling wire without rendering the relay switching circuit of the telephone station inoperative, whereby initially said first relay switching circuit of the supervisory means is deenergized and then, upon restoration of the control signal from the telephone station, the second relay switching circuit of the supervisory means is operated; and said means responsive to hanging up comprising a switch contact arranged to render the relay switching circuit of the telephone station inoperative.

5. A telephone intercommunication system as claimed in claim 2, in which the said second switching means comprises a second, self-holding, relay switching circuit of the supervisory means, arranged to be energized together with said first relay circuit to prepare a hold loop across idle contacts of the first relay circuit, and said supervisory means further comprising a third relay switching circuit having a switch contact in the holding current path of the second relay switching circuit, the arrangement being such that upon operation of said manually operable means of a telephone station only the first switching means is deenergized, while upon hanging up of a telephone station the first relay switching circuit is deenergized and the third relay switching circuit is energized.

* * * * *